United States Patent [19]

DeColibus

[11] 3,928,057

[45] Dec. 23, 1975

[54] TiO$_2$ PIGMENT COATED WITH POROUS ALUMINA/SILICA AND DENSE SILICA

[75] Inventor: Raymond Lew DeColibus, Camden, Tenn.

[73] Assignee: E. I. Du Pont de Nemours & Company, Wilmington, Del.

[22] Filed: May 30, 1974

[21] Appl. No.: 474,540

[52] U.S. Cl. ............................ 106/300; 106/308 B
[51] Int. Cl.$^2$ ............................................ C09C 1/36
[58] Field of Search .................... 106/300, 308 B

[56] References Cited
UNITED STATES PATENTS

| | | | |
|---|---|---|---|
| 3,410,708 | 11/1968 | McGinnis | 106/308 B |
| 3,437,502 | 4/1969 | Weiner | 106/300 |
| 3,510,335 | 5/1970 | McGinnis | 106/300 |
| 3,515,566 | 6/1970 | Moody et al. | 106/300 |
| 3,545,994 | 12/1970 | Lott, Jr. et al. | 106/300 |
| 3,649,322 | 3/1972 | Foss | 106/300 |

*Primary Examiner*—Patrick P. Garvin
*Assistant Examiner*—J. V. Howard

[57] ABSTRACT

A coated titanium dioxide pigment, and the process for its preparation, consisting essentially of a core of pigmentary titanium dioxide (TiO$_2$), a porous inner coating of at least one hydrous oxide selected from the group consisting of silica (SiO$_2$) and alumina (Al$_2$O$_3$), said silica being present in an amount less than 12% by weight, based on the uncoated pigment, and said alumina being present in an amount less than 11% by weight, based on the uncoated pigment, and a dense outer coating of silica in an amount between about 2% and about 17% by weight, based on the uncoated pigment. Optionally the coated pigment can have an additional coating of porous Al$_2$O$_3$, up to 5%. As a component of coating compositions, this pigment provides a high degree of hiding power and durability.

18 Claims, No Drawings

TiO₂ PIGMENT COATED WITH POROUS ALUMINA/SILICA AND DENSE SILICA

BACKGROUND OF THE INVENTION

The treatment of pigmentary titanium dioxide in the rutile or anatase form with hydrous oxides, especially silica and alumina, is known in the art to provide resistance to chalking and discoloration in paints, good opacity in paper and good hiding power in flat paints. Typical application techniques for applying silica are taught in U.S. Pat. Nos. 2,885,366; 2,387,534; and 2,296,636. Generally, the silica is applied to the pigment by precipitation from sodium silicate with acid in an aqueous slurry of the pigment. The resulting pigments, having a dense, i.e., nonporous silica coating, have good durability but do not provide as high a degree of hiding power as is desirable in many paint compositions. Applying a loose, i.e., porous, coating consisting essentially of alumina and silical to pigmentary titanium dioxide according to the process taught in U.S. Pat. No. 3,591,398, provides a coated pigment having generally better hiding power than the densely coated pigment, but lower durability than is desired for many applications.

One method to achieve a high degree of durability and hiding power is disclosed in U.S. Pat. No. 3,649,322 wherein pigmentary $TiO_2$ is coated with a dense skin of hydrated aluminum silicate and optionally an additional coating of porous alumina on the dense skin.

This invention provides for a pigmentary $TiO_2$ coated in such a way as to combine the durability of dense silica coatings with the hiding power of loose hydrous coatings.

For purposes of this application pigmentary means that the material is pulverulent and of good whiteness with an average particle diameter of from about 0.15 to about 0.3 micron.

SUMMARY OF THE INVENTION

This invention provides for a coated $TiO_2$ pigment consisting essentially of a core of pigmentary $TiO_2$, a porous inner coating of at least one hydrous oxide selected from a group consisting of silica ($SiO_2$) and alumina ($Al_2O_3$), said silica being present in an amount less than about 12% by weight, and preferably between about 1% and about 11% by weight, based on the uncoated pigmentary $TiO_2$ and said alumina being present in an amount less than about 11% by weight, and preferably between about 1% and about 10% by weight, based on the uncoated pigment and a dense outer coating of silica in an amount between about 2% and about 17% by weight, based on the uncoated pigment. Optionally an additional 0.5% to 5% by weight of porous $Al_2O_3$, based on the uncoated pigment, can be applied to the outer coating of the pigment to facilitate filtration of the pigment. The preferred amount of porous silica in the inner coating is 7% and the preferred amount of porous alumina in the inner coating is 6%. The preferred amount of dense silica in the outer coating is 8%. In cases where additional porous alumina is applied to the outer coating, the preferred amount of alumina applied is about 0.5%.

In accordance with the present invention there is provided a process for preparing coated $TiO_2$ pigment by the steps of (i) adding to an aqueous slurry of pigmentary $TiO_2$ maintained at a pH below 7.5, preferably below about 7, an aqueous solution of soluble silicate in an amount calculated to provide from 0% to about 12% by weight of silica, calculated as $SiO_2$, based on said pigmentary $TiO_2$, (ii) adding to said slurry maintained at a pH between about 6 and 10, preferably between about 6 and 8, an aqueous solution of soluble aluminate in an amount calculated to provide from 0% to about 11% by weight of alumina, calculated as $Al_2O_3$, based on said pigmentary $TiO_2$, (iii) adjusting the pH of said slurry to between about 9 and 10, (iv) adding to said slurry an aqueous solution of soluble silicate in an amount calculated to provide from about 3% to about 16% by weight silica, calculated as $SiO_2$, based on said pigmentary $TiO_2$ and (v) slowly adding dilute acid, preferably having a normality of less than about 4, to said slurry until the pH of said slurry is between about 6 and 7.7, preferably between about 7.1 and 7.5. Optionally, after step (v) an aqueous solution of a soluble aluminate can be added to said slurry, while maintaining the pH of said slurry below about 8 and preferably above 3, in an amount to provide from about 0.5% to about 5% by weight of alumina, calculated as $Al_2O_3$, based on said pigmentary $TiO_2$.

The order of process steps (i) and (ii) is not particularly critical in that a suitably coated pigment results when the order of these steps is reversed or performed simultaneously.

Although curing the slurry at various stages in the process is not essential to the attainment of good pigment properties, in applications where curing is deemed desirable the slurry can be cured, for example, at temperatures of at least 60°C. for at least 15 minutes and preferably at least 30 minutes after any or all of process steps (i), (ii), (iii) and (v).

The base titanium dioxide pigment may be prepared by the high temperature vapor phase oxidation of $TiCl_4$, the vapor phase hydrolysis of $TiCl_4$, or the hydrolysis of colloidally seeded sulfuric acid solutions of titaniferous raw materials such as ilmenite. The hydrolysate of the sulfuric acid process must be washed and calcined to develop the crystalline characteristic and particle size needed for the good light scattering characteristics of pigments. The temperature of the slurry being treated may vary from room temperature to 90°C., but it is preferred that the temperature be from 40°C. to 70°C. The slurry should be agitated throughout the precipitation of both the silica and the alumina to insure general uniformity of the pH conditions within the specified ranges.

Any soluble silica may be used in the process including sodium or potassium silicate. Commercially available water soluble sodium silicates with $SiO_2/Na_2O$ weight ratios from about 1.6 to about 3.75 and varying from 32% to 54% by weight of solids, with or without further dilution are the most practical. To apply a porous silica to the base pigment, the slurry must be acid during the addition of the effective portion of the soluble silicate. The acid used may be any acid, such as HCl, $H_2SO_4$, $HNO_3$ or $H_3PO_4$ having a dissociation constant sufficiently high to precipitate silica, and used in an amount sufficient to maintain an acid condition in the slurry. Compounds such as $TiOSO_4$ or $TiCl_4$ which hydrolyze to form acid may also be used. Alternative to adding all the acid first, the soluble silicate and the acid may be added simultaneously so long as the acidity of the slurry is maintained at a pH of below about 7.5. To apply a dense silica coating to the porous coating, the slurry must be basic during the addition of the effective portion of the soluble silicate, then slowly acidified over a period of preferably at least 45 minutes until a pH between about 7.1 and 7.7 is reached.

The porous alumina of the inner coating, essential to good film integrity, must be precipitated in an environment having a pH from about 6 to about 9 to avoid subjecting the treated pigment to unduly acid or alkaline conditions. For purposes of this invention it is preferable to add about 75% of the total desired alumina as sodium aluminate, while maintaining the slurry pH between about 6 and 8. The remainder of the sodium aluminate is added, allowing the slurry pH to rise to between about 8 and 9. The optional, porous alumina applied to the dense outer coating can be applied at somewhat lower pH levels, e.g., 4–6, than used for applying the inner coating, but pH levels between about 6 to 8 are preferred.

This process may be applied to pigments which have been previously treated with oxides such as titania, but their presence is not essential to the benefits herein obtained. After treatment according to this process, the pigment is recovered by known procedures including neutralization of the slurry if necessary, filtration, washing, drying and frequently a dry grinding step such as micronizing. Drying is not necessary, however, as a thick slurry of the product can be used directly in preparing emulsion paints where water is the liquid phase. The process provides a method for obtaining good hiding power and good durability in titanium dioxide pigments.

DESCRIPTION OF TESTS

In the examples which follow, the test results are obtained by the procedures described below. The paint employed for these procedures is a conventional water-based emulsion paint containing about 3 lbs/gal. (0.36 kilograms/liter) $TiO_2$ pigment, about 1.6 lbs/gal. (0.19 kilograms/liter) of silicate extenders and about 1.7 lbs/gal. (0.20 kilograms/liter) of vinyl acrylic resinous binder in an aqueous emulsion. The pigment volume concentration of this paint is about 49%, the remaining 51% by volume of solids consisting essentially of binder. The $TiO_2$ pigment used in the standard paint is a commercial $TiO_2$ pigment produced by the vapor phase oxidation of $TiCl_4$ and treated with $Al_2O_3$ and $SiO_2$ according to the procedure of Angerman U.S. Pat. No. 3,591,398. This $TiO_2$ pigment consists essentially of 87.6% by weight of $TiO_2$, 6.2% by weight of $Al_2O_3$ and 6.2% by weight of $SiO_2$, based on the weight of the treated pigment.

ACID SOLUBILITY

Acid solubility of the coated $TiO_2$ pigments of this invention is measured by digesting a predetermined quantity of coated pigment in sulfuric acid and spectrophotometrically comparing it to a standard $TiO_2$ sample similarly treated. The standard spectrophotometric curve is prepared as follows: a standard solution is prepared by dissolving 15 g. of ammonium sulfate and 1.0118 g. of $TiO_2$, containing 98.83% by weight $TiO_2$, in 20 ml. of 66° Be. sulfuric acid and diluting to 800 ml. with water. Eighty milliliters of the sulfuric acid solution is then added to this solution. After allowing the resulting solution to cool to room temperature, it is diluted to one liter with water. The solution contains 0.001 g. of $TiO_2$ per ml. and should be allowed to stand for one week before using.

Samples of 2, 4, 6 and 8 ml. of the aboveprepared standard solution are each mixed with 10 ml. of 30% hydrogen peroxide and diluted to 100 ml. with 10% sulfuric acid. After standing for one hour, the absorbance of these solutions is read using a Beckman Model DK, DU or B spectrophotometer against a reference solution, prepared by diluting 10 ml. of 30 % hydrogen peroxide to 100 ml. with 10% sulfuric acid at 400 m$\mu$ using 10 mm. cells. A plot of titanium peroxide concentration in mg/l. versus optical density is made for these samples.

To determine acid solubility of the coated $TiO_2$ pigments, 0.2000 g. of coated $TiO_2$ pigment is added with stirring to 10 ml. 66° Be. sulfuric acid at 175°C. The pigment is digested at 175°C. for one hour. After digestion the sample is quenched by pouring into crushed ice, made from distilled water. The sample is diluted to 100 ml. with water and filtered. Ten milliliters of the filtrate is mixed with 2 ml. of 30% hydrogen peroxide and diluted to 25 ml. with 10% sulfuric acid. After one hour the absorbence of the sample is read against a reference solution, prepared by diluting 2 ml. of 30% hydrogen peroxide to 25 ml. with 10% sulfuric acid.

The concentration of soluble $TiO_2$ is determined from the above-prepared standard spectrophotometric curve from the measured optical density and the percent soluble $TiO_2$, i.e., the acid solubility, is calculated by dividing the concentration of soluble $TiO_2$ by 8.

HIDING POWER

A film of prepared paint is drawn on a Morest Chart Form 09, a glossy paper chart having black and white areas, using a draw-down blade with an 0.0025 inch (0.0064 cm.) clearance, at 50% R.H. and 72°C. (22°C.). When the film is dried, the reflectances over the white and black backgrounds are measured using a Gardner Automatic Multipurpose Reflectometer using a green filter. One reading is taken on each of two "white" and "black" sections of each of four charts.

The scattering power (SX) is determined, using the above-measured reflectances, from the appropriate Kubelka-Munk Opacity Chart (D.B. Judd, "Optical Specification of Light Scattering Materials", *Journal of Research of the National Bureau of Standards*, Vol. 19, 1937, p. 287).

For examples 1–16 and the Control, where the object of the calculation is simply relative SX at equal paint volume, the SX of the paint is multiplied by the factor F, determined from:

$$F = \frac{\text{weight of standard film}}{\text{weight of sample film}} \times \frac{\text{density of sample paint}}{\text{density of standard paint}}$$

For Examples 17–26, no correction for film weight need be applied.

The relative hiding power (H.P.) of the samples is calculated as:

$$\text{H.P.} = \frac{SX \text{ of sample}}{SX \text{ of standard}} \times 100$$

TINTING STRENGTH

The tinting strength test compares the green reflectance of paints which contain the same ratio of $TiO_2$ pigment to tinting gel. Although any color tint could be used for this test, green or blue tints are preferred because the eye is more sensitive to changes in strength with these colors. The tinting gel is prepared by mixing the following ingredients:

| | Parts by weight |
|---|---|
| Distilled water | 77.6 |
| A commercially available organic pigment sold by the Du Pont Company under the Trade Name Monastral Green B | 20.0 |
| Hydroxyethyl cellulose | 2.4 |

Ten grams of the above-described tinting gel is mixed with 100 g. of paint. A film of prepared paint is drawn on white lacquered paper using a draw-down blade with 0.008 inch (0.020 cm.) clearance. The film is dried for at least 2 hours. The reflectance of the dried film is measured using a green filter on a Hunter Multi-purpose Reflectometer. From the value of this reflectance, $R_\infty$, the value of the ratio of the absorption coefficient, K, to the scattering coefficient, S, is found using the Kebelka-Munk Table (D.B. Judd and G. Wyszecki, "Color in Business, Science, and Industry" John Wiley, Dr. Sans, 1963, Appendi D). Values beyond the range shown in the Table can be calculated by $$K/S = \frac{(1 - R_\infty)^2}{2R_\infty}$$

Expressing the tinting strength on a relative basis, a value of 100 is assigned as the tinting strength of the standard. The relative value for the sample is calculated as follows:

$$\text{Relative Tinting Strength} = \frac{(K/S) \text{ Standard}}{(K/S) \text{ Sample}} \times 100$$

The titanium dioxide used in all the following examples is produced by the vapor phase oxidation of titanium tetrachloride. The percentage compositions of alumina and silica, referred to hereinunder and elsewhere in the specification, are by weight, based on the weight of the $TiO_2$ pigment, and are calculated as $SiO_2$ and $Al_2O_3$, respectively, unless otherwise specified.

EXAMPLE 1 AND CONTROL 20

Three thousand grams of pigmentary $TiO_2$ is slurried in sufficient water to achieve 300 g. $TiO_2$ per liter. The pH of the slurry is reduced to 1.3 by adding 0.045 liter of 96% $H_2SO_4$. The slurry is heated to 70°C. At this temperature a solution of sodium silicate at a concentration of 400 g. per liter $SiO_2$ and having a weight ratio of $SiO_2/Na_2O_2$ of 3.25/1 is gradually added during agitation until the pH of the slurry reaches 6.9. The amount of $SiO_2$ used is 7%. The slurry cured for 30 minutes at 70°C. Ninety-six percent sulfuric acid and a sodium aluminate solution containing 379 g. per liter $Al_2O_3$ are simultaneously added at rates which keep the pH between 6 and 8. After 75% of the sodium aluminate has been added, the pH of the slurry is allowed to rise to 8.5 by adding the remaining sodium aluminate. The slurry of the pigment with the 6% by weight $Al_2O_3$ is then adjusted to between 9.0 and 9.5 after which the slurry is heated to 90°C. An additional 8% $SiO_2$ is added to the slurry as aqueous sodium silicate at a concentration of 400 g. per liter $SiO_2$. The pH of the slurry after the additional $SiO_2$ is added is 11.2. Maintaining a slurry temperature of at least 90°C., a 10% by weight over a period of not less than 1.5 hours until the pH of the slurry drops to between about 7.3 and 7.6. The slurry is cured for 1 hour at 90°C., maintaining the slurry pH at between about 7.3 and 7.6 with the 10% $H_2SO_4$ solution. The pigment is recovered by filtering, washing, drying at about 120°C., and micronizing. The properties of the pigment are shown in Table I.

CONTROL

The procedure of Example 1 is repeated except that the pigment is recovered immediately after the addition of $Al_2O_3$. The properties of the pigment are shown in Table I.

It can be seen in Table I that the pigment of Example 1 has higher H.P. and much lower acid solubility than the Control.

EXAMPLE 2

The procedure of Example 1 is followed except that only 3% $SiO_2$ is added during the second (dense) $SiO_2$ addition and the slurry is not cured after the second $SiO_2$ addition. The properties of this pigment listed in Table I show that acid solubility remains fairly low even at low levels of dense $SiO_2$.

EXAMPLE 3

The procedure of Example 1 is followed except that 5% $SiO_2$ is added during the second (dense) $SiO_2$ addition. Table I shows improved H.P. and acid solubility for this pigment.

EXAMPLE 4

The procedure of Example 1 is followed except that 12% $SiO_2$ is added during the second (dense) $SiO_2$ addition. The properties of the resulting pigment are shown in Table I.

EXAMPLE 5

The procedure of Example 1 is followed except that 16% $SiO_2$ is added during the second (dense) $SiO_2$ addition. The properties of this pigment are shown in Table I.

EXAMPLE 6

The procedure of Example 1 is followed except that after the final cure and prior to the isolation of the pigment, an additional 0.5% $Al_2O_3$ is added to the slurry as sodium aluminate while holding the pH of the slurry at between about 3 and 4 with 96% $H_2SO_4$. The final pH of the slurry is adjusted to 7.6 with sodium hydroxide. The acid solubility of this pigment shown in Table I remains very low.

EXAMPLE 7

The procedure of Example 6 is followed except that 2% $Al_2O_3$ is added. The properties of this pigment listed in Table I show that the acid solubility, the H.P. and the T.S. remain high.

EXAMPLE 8

The procedure of EXAMPLE 6 is followed except that 5% $Al_2O_3$ is added. The properties of this pigment listed in Table I show that acid solubility, the H.P. and the T.S. remain good.

EXAMPLE 9

The procedure of Example 6 is followed except that the final 0.5% $Al_2O_3$ addition is made while holding the slurry pH between about 6 and 8. As shown in Table I the H.P. and the T.S. are higher than those for the pigment of Example 6. The acid solubility for this pigment is also good.

EXAMPLE 10

The procedure of Example 7 is followed except that the final 2% $Al_2O_3$ addition is made while holding the slurry pH between about 6 and 8. Again the H.P. and the T.S. are higher for this pigment than for the pigment of Example 6 and the acid solubility is about equal to the pigment of Example 6.

EXAMPLE 11

The procedure of Example 8 is followed except that the final 5% $Al_2O_3$ addition is made while holding the slurry pH between about 6 and 8. As shown in Table I the acid solubility of the resulting pigment is low. The H.P. and the T.S. is better than that of the pigment of Example 6.

EXAMPLE 12

The procedure of Example 10 is followed except that the cure after the first (porous) $SiO_2$ addition is omitted. The acid solubility of the resulting pigment, shown in Table I, remains low.

EXAMPLE 13

The procedure of Example 10 is followed except that the cures after the first (porous) $SiO_2$ addition and after the first (porous) $Al_2O_3$ addition are omitted. Table I shows that the acid solubility for this pigment remains low.

EXAMPLE 14

The procedure of EXAMPLE 10 is followed except that all cures are deleted. Table I shows that the acid solubility of the resulting pigment remains low.

EXAMPLE 15

The procedure of Example 14 is followed except that the 10% $H_2SO_4$ is added over a period of 60 minutes. The properties of the resulting pigment are shown in Table I.

EXAMPLE 16

The procedure of EXAMPLE 5 is followed except that 0.5% $Al_2O_3$ is added prior to isolation of the pigment while holding the slurry pH between about 6 and 8 with 96% $H_2SO_4$ and all cures are deleted. Table I shows that the acid solubility of the resulting pigment is low, but the oiled H.P. is down somewhat.

EXAMPLE 17

The procedure of Example 15 is followed except that the initial addition of 96% $H_2SO_4$ is 0.070 liter, the initial sodium silicate addition amounts to 11% $SiO_2$ and the initial sodium aluminate addition amounts to 2% $Al_2O_3$. Table I shows that the resulting pigment has low acid solubility.

EXAMPLE 18

The procedure of Example 17 is followed except that the first sodium aluminate addition amounts to 6% $Al_2O_3$. Table I shows that the acid solubility of the resulting pigment remains low.

EXAMPLE 19

The procedure of Example 17 is followed except that the first sodium aluminate addition amounts to 10% $Al_2O_3$. Table I shows that the acid solubility of the resulting pigment is somewhat higher than other pigments in this series, but still much lower than the acid solubility for the Control.

EXAMPLE 20

The procedure of Example 15 is followed except that the first sodium aluminate addition amounted to 2% $Al_2O_3$. Table I, listing the properties of this pigment, shows that the lower porous hydrous oxide levels are generally giving greater hiding power and lower acid solubility than higher porous oxide levels.

EXAMPLE 21

The procedure of Example 15 is followed except that the first sodium aluminate addition amounted to 10% $Al_2O_3$. Again, as shown in Table I, low acid solubility results.

EXAMPLE 22

The procedure of Example 15 is followed except that the initial 96% $H_2SO_4$ addition amounted to 0.020 liter, the initial sodium silicate addition amounted to 3% $SiO_2$. The initial sodium aluminate addition amounted to 2% $Al_2O_3$. The properties of the resulting pigment, shown in Table I indicate improved hiding power and relatively low acid solubility for lower porous oxide levels.

EXAMPLE 23

The procedure of Example 22 is followed except that the initial sodium aluminate addition amounts to 6% $Al_2O_3$. The properties of this pigment are shown in Table I.

EXAMPLE 24

Three thousand grams of pigmentary $TiO_2$ is slurried in sufficient water to achieve a solids level of 400 g. $TiO_2$ per liter. The slurry is heated to 60°C. The pH of the slurry is adjusted to 5.2 with 50% aqueous NaOH. Maintaining the slurry temperature at 60°C., a solution of sodium silicate at a concentration of 400 g. per liter $SiO_2$ and having a weight ratio of $SiO_2/NaO_2$ of 3.25/1 is gradually added during agitation until the pH of the slurry reaches about 7.3. The amount of $SiO_2$ used is 1.5%. The slurry is cured for 30 minutes at 60°C. Ninety-six percent sulfuric acid and aqueous sodium aluminate (3% $Al_2O_3$) are simultaneously added at rates which keep the pH between 8 and 9. The slurry is heated to 90°C. and the pH of the slurry is adjusted to 9.5 with aqueous NaOH. An additional 8% $SiO_2$ is added to the slurry as aqueous sodium silicate at a concentration of 400 g. per liter $SiO_2$. The pH of the slurry after the addition of this $SiO_2$ is 12.0. The pH of the slurry is lowered to between about 7.3 and 7.6 by gradually adding 10% $H_2SO_4$ over a period of 75 minutes. While maintaining the slurry pH between about 6 and 8, 0.5% $Al_2O_3$ is added as aqueous sodium aluminate. The pH is adjusted to 7.6, after which the pigment is recovered as in Example 1.

The properties of the resulting pigment are listed in Table I.

EXAMPLE 25

Three thousand grams of pigmentary $TiO_2$ is slurried in sufficient water to achieve a solids level of 300 g. $TiO_2$ per liter. The slurry is heated to 40°C. And the pH is adjusted to 9.2 with 0.50% aqueous NaOH. Ninety-six percent sulfuric acid and aqueous sodium aluminate (2% $Al_2O_3$) are simultaneously added at rates which keep the pH between about 8.5 and 9.5. The slurry is cured 30 minutes and heated to 90°C. The pH is then adjusted to 9.8 with NaOH, after which aqueous sodium silicate (8% $SiO_2$) is added. Over a period of 60 minutes 10% $H_2SO_4$ is added to the slurry dropping the slurry pH to 6.1. Then aqueous sodium aluminate (0.5% $Al_2O_3$) is added to the slurry while maintaining the slurry pH between 6 and 8 with 96% $H_2SO_4$. The resulting pigment is recovered as in Example 1.

The properties of this pigment are listed in Table I.

EXAMPLE 26

The procedure of Example 9 is repeated except that no $Al_2O_3$ is added to the slurry after the first $SiO_2$ addition.

The properties of this pigment are listed in Table I.

TABLE I

| Example | Coating Composition, % Porous $SiO_2$ | Porous $Al_2O_3$ | Dense $SiO_2$ | Porous $Al_2O_3$ | Acid Solubility, % | H.P. | Oiled H.P. | Air H.P. | T.S. |
|---|---|---|---|---|---|---|---|---|---|
| Control | 7 | 6 | — | — | 12–15 | 100 | 70 | 30 | 100 |
| 1 | 7 | 6 | 8 | — | 1.6 | 117 | 66 | 51 | 110 |
| 2 | 7 | 6 | 3 | — | 5.4 | 110 | 61 | 49 | 107 |
| 3 | 7 | 6 | 5 | — | 3.4 | 112 | 62 | 50 | 108 |
| 4 | 7 | 6 | 12 | — | — | 102 | 57 | 45 | 114 |
| 5 | 7 | 6 | 16 | — | — | 109 | 63 | 46 | 119 |
| 6 | 7 | 6 | 8 | 0.5 | 2.6 | 104 | 68 | 36 | 100 |
| 7 | 7 | 6 | 8 | 2.0 | 3.7 | 103 | 67 | 36 | 97 |
| 8 | 7 | 6 | 8 | 5.0 | 3.5 | 107 | 66 | 41 | 103 |
| 9 | 7 | 6 | 8 | 0.5 | 2.4 | 111 | 70 | 41 | 104 |
| 10 | 7 | 6 | 8 | 2.0 | 2.1 | 106 | 71 | 35 | 104 |
| 11 | 7 | 6 | 8 | 5.0 | 3.4 | 113 | 71 | 42 | 104 |
| 12 | 7 | 6 | 8 | 2.0 | 2.0 | 101 | 70 | 31 | 103 |
| 13 | 7 | 6 | 8 | 2.0 | 1.7 | 112 | 70 | 42 | 106 |
| 14 | 7 | 6 | 8 | 2.0 | 1.9 | 105 | 71 | 34 | 107 |
| 15 | 7 | 6 | 8 | 2.0 | 2.2 | 103 | 69 | 34 | 104 |
| 16 | 7 | 6 | 16 | 0.5 | 2.5 | 101 | 56 | 45 | 100 |
| 17 | 11 | 2 | 8 | 0.5 | 2.0 | 103 | 52 | 51 | — |
| 18 | 11 | 6 | 8 | 0.5 | 2.0 | 104 | 51 | 53 | — |
| 19 | 11 | 10 | 8 | 0.5 | 8.0 | 101 | 46 | 55 | — |
| 20 | 7 | 2 | 8 | 0.5 | 2.2 | 112 | 65 | 47 | — |
| 21 | 7 | 10 | 8 | 0.5 | 4.1 | 103 | 48 | 55 | — |
| 22 | 3 | 2 | 8 | 0.5 | 3.4 | 110 | 57 | 53 | — |
| 23 | 3 | 6 | 8 | 0.5 | 2.2 | 112 | 65 | 47 | — |
| 24 | 1.5 | 3 | 8 | 0.5 | 2.3 | 96 | 52 | 44 | — |
| 25 | 0 | 2 | 8 | 0.5 | — | 105 | 55 | 50 | — |
| 26 | 7 | 0 | 8 | 0.5 | 3.0 | 102 | 55 | 47 | — |

What is claimed is:

1. Coated $TiO_2$ pigment consisting essentially of a core of pigmentary $TiO_2$, a porous inner coating of silica and alumina, said silica, calculated as $SiO_2$, being present in an amount less than about 12% by weight, based on said pigmentary $TiO_2$, and said alumina, calculated as $Al_2O_3$, being present in an amount less than about 11% by weight, based on said pigmentary $TiO_2$, and a dense outer coating of silica in an amount, calculated as $SiO_2$, between about 2% by weight and about 17% by weight, based on said pigmentary $TiO_2$.

2. Coated $TiO_2$ pigment according to claim 1 wherein said silica in said porous inner coating is present in an amount between about 1% and 11% and wherein said alumina in said porous inner coating is present in an amount between about 1% and 10%.

3. Coated $TiO_2$ pigment according to claim 1 wherein said silica in said porous inner coating is present in an amount of about 7%, said alumina in said porous inner coating is present in an amount of about 6%, and said silica in said dense outer coating is present in an amount of about 8%.

4. Coated $TiO_2$ pigment according to claim 1 having a porous outer coating of alumina present in an amount, calculated as $Al_2O_3$, between about 0.5% by weight to about 5% by weight, based on said pigmentary $TiO_2$.

5. Coated $TiO_2$ pigment according to claim 4 wherein said silica in said porous inner coating is present in an amount of about 7%, said alumina in said porous inner coating is present in an amount of about 6%, and said silica in said dense outer coating is present in an amount of about 8%.

6. Coated $TiO_2$ pigment according to claim 4 wherein said silica in said porous inner coating is present in an amount of about 3%, said alumina in said porous inner coating is present in an amount of about 6%, and said silica in said dense outer coating is present in an amount of about 8%.

7. Process for preparing coated $TiO_2$ pigment by the steps of:

i. adding to an aqueous slurry of pigmentary $TiO_2$, maintained at a pH below about 7.5, an aqueous solution of soluble silicate in an amount calculated to provide less than about 12% by weight of silica, calculated as $SiO_2$, based on said pigmentary $TiO_2$, ii. adding to slurry, maintained at a pH between about 6 to 10, an aqueous solution of soluble aluminate in an amount calculated to provide less than about 11% by weight of alumina, calculated as $Al_2O_3$, based on said pigmentary $TiO_2$, iii. adjusting the pH of said slurry to between about 9 and 10, iv. adding to said slurry an aqueous solution of soluble silicate in an amount calculated to provide from about 3% to about 16% by weight of silica, based on said pigmentary $TiO_2$, and v. slowly adding dilute acid to said slurry until the pH of said slurry is between about 6 and about 7.7.

8. Process for preparing coated $TiO_2$ pigment according to claim 7 wherein said dilute acid of step (v) has a normality of less than about 4.

9. Process for preparing coated $TiO_2$ pigment according to claim 7 wherein said aqueous slurry of pigmentary $TiO_2$ is heated to a temperature of at least 40°C prior to step (i).

10. Process for preparing coated $TiO_2$ pigment according to claim 7 wherein said slurry of pigmentary $TiO_2$ is heated to a temperature of at least 70°C. prior to step (i).

11. Process for preparing coated $TiO_2$ pigment according to claim 10 wherein said slurry is cured for at least 30 minutes prior to step (ii).

12. Process for preparing coated $TiO_2$ pigment according to claim 11 wherein, following step (v), said slurry is cured for at least one hour at about 90°C. while maintaining the pH of said slurry between about 7.3 and about 7.6.

13. Process for preparing coated $TiO_2$ pigment according to claim 10 by the additional step of:
vi. adding to slurry an aqueous solution of a soluble aluminate in an amount calculated to provide from about 0.5% to about 5% by weight of alumina, calculated as $Al_2O_3$, based on said pigmentary $TiO_2$ while maintaining the pH of said slurry between about 3 and 8.

14. Process for preparing coated $TiO_2$ pigment according to claim 13 wherein said slurry is maintained between about 6 and 8 during step (ii).

15. Process for preparing coated $TiO_2$ pigment according to claim 13 wherein the pH of said slurry is maintained between about 3 and 4 during step (vi).

16. Process for preparing coated $TiO_2$ pigment according to claim 15 wherein said slurry is heated to a temperature of at least 90°C. prior to step (iv).

17. Process for preparing coated $TiO_2$ pigment according to claim 13 wherein the pH of said slurry is maintained between about 6 and 8 during step (vi).

18. Process for preparing coated $TiO_2$ pigment according to claim 17 wherein said dilute acid of step (v) is added to said slurry over a period of at least 45 minutes while maintaining the temperature of said slurry at at least 90°C.

* * * * *